(12) United States Patent
Van der Schoot

(10) Patent No.: US 7,069,846 B2
(45) Date of Patent: Jul. 4, 2006

(54) INSTALLATION FOR THE TREATMENT OF PRODUCTS IN BULB OR TUBER FORM

(75) Inventor: Peter Willem Carolus Van der Schoot, AG Groot-Ammers (NL)

(73) Assignee: Van Der Schoot Engineering B.V., Groot-Ammers (NL)

( * ) Notice: Subject to any disclaimer, the term of this patent is extended or adjusted under 35 U.S.C. 154(b) by 98 days.

(21) Appl. No.: 10/497,438

(22) PCT Filed: Dec. 3, 2002

(86) PCT No.: PCT/NL02/00784

§ 371 (c)(1),
(2), (4) Date: Jun. 2, 2004

(87) PCT Pub. No.: WO03/047372

PCT Pub. Date: Jun. 12, 2003

(65) Prior Publication Data

US 2005/0076797 A1 Apr. 14, 2005

(30) Foreign Application Priority Data

Dec. 3, 2001 (NL) .................................... 1019471

(51) Int. Cl.
*A23N 15/00* (2006.01)
*A23N 15/08* (2006.01)
(52) U.S. Cl. .............................. 99/626; 99/623; 99/628
(58) Field of Classification Search ................. 99/584, 99/586, 616–620, 622–630; 15/3.16–3.18; 426/481–483
See application file for complete search history.

(56) References Cited

U.S. PATENT DOCUMENTS

| | | | | | |
|---|---|---|---|---|---|
| 2,178,007 | A | * | 10/1939 | Thompson | ................... 99/624 |
| 3,618,651 | A | * | 11/1971 | Hart et al. | ................... 426/287 |
| 4,242,952 | A | * | 1/1981 | van der Schoot | ............. 99/625 |
| 4,509,414 | A | * | 4/1985 | Chiu et al. | ..................... 99/585 |
| 5,931,088 | A | * | 8/1999 | van der Schoot | ............. 99/625 |

FOREIGN PATENT DOCUMENTS

| EP | 0 562 541 | * | 9/1993 |
|---|---|---|---|
| EP | 0 562 541 A1 | | 9/1993 |
| EP | 0 838 162 A1 | | 4/1998 |
| NL | 90260 | | 1/1959 |

* cited by examiner

Primary Examiner—Timothy F. Simone
(74) Attorney, Agent, or Firm—The Webb Law Firm

(57) ABSTRACT

An installation for the treatment of products in bulb or tuber form in relation to the removal of the outermost layer thereof, comprising a channel through which the products can be transported between an inlet and an outlet that are at different levels, which channel is delimited by a first series of rotary treatment elements arranged alongside one another and extending transversely to the direction of transport, and by an opposing boundary opposite the series of treatment elements. The opposing boundary is determined by a second series of rotary treatment elements while the input is at a higher level than the output.

19 Claims, 5 Drawing Sheets

INSTALLATION FOR THE TREATMENT OF PRODUCTS IN BULB OR TUBER FORM

BACKGROUND OF THE INVENTION

1. Field of the Invention

The invention relates to an installation for the treatment of products in bulb or tuber form in relation to the removal of the outermost layer thereof, which installation has a channel through which the products can be transported between an inlet and an outlet that are at different levels, which channel is delimited by a first series of rotary treatment elements arranged alongside one another and extending transversely to the direction of transport, and by an opposing boundary opposite the series of treatment elements.

2. Description of the Related Art

An installation of this type is disclosed in Netherlands Patent 166386 and is used for brushing dry steam- or lye-peeled tubers, for example potatoes. This known installation has a treatment channel positioned at an angle, the bottom wall of which is formed by a series of drivable brush rollers and the top wall of which is formed by the underpart of a drivable endless conveyor belt. The brush rollers transport the tubers from the lowest end of the treatment channel to the highest end thereof. The underpart is driven in the direction opposing the transport device for the brush rollers.

The disadvantage of this known installation is that this is fairly complex and expensive, both to purchase and to maintain. The brush rollers have a fairly aggressive action on the tubers, as a result of which a lot of tuber material is lost. Moreover, the brush rollers themselves also wear fairly severely.

A further disadvantage is that the transport of the tubers is fairly susceptible to the dimensions of the tubers. As a result blockage can easily occur and the installation has to be continually monitored. This adversely affects the operational reliability of the installation.

It also proves difficult to control the residence time of the tubers in the installation. This is mainly determined by the speed of revolution of the brush rollers, which, however, is dictated by the requirement that the skin has to be properly removed from the tubers. Furthermore, it is found that the known installation cannot be cleaned easily.

SUMMARY OF THE INVENTION

The aim of the invention is, therefore, to provide an installation of the abovementioned type that does not have these disadvantages or has these disadvantages to a lesser extent. Said aim is achieved in that the opposing boundary is determined by a second series of rotary treatment elements and in that the input is at a higher level than the output.

With the installation according to the invention the products move downwards under the influence of gravity in the channel between the two series of treatment elements, from the relatively high input to the relatively low output. Preferably, this channel is vertical.

As a result of this arrangement of the treatment elements along an essentially vertical channel, the transport of the products can be controlled in the desired manner. The residence time of the products in the channel, and thus the duration of the treatment to which they are subjected, can be influenced by adjusting the speed of revolution of the treatment elements. If necessary, these can be driven at different speeds of rotation in order to retard the downward movement of the products through the channel to a greater or lesser extent.

The series of treatment elements can be constructed in various ways. According to a first possibility, the treatment elements in each series are alternately offset in zigzag fashion. They then enclose a channel that is likewise of zigzag shape, which makes intensive treatment of the products possible.

As an alternative, the series can be straight. In this way an essentially straight channel is obtained. Furthermore, the treatment elements can be alternately offset in zigzag fashion. With this arrangement a somewhat zigzag-shaped channel is obtained. This is also the case according to a further alternative wherein at least the series are offset parallel with respect to one another over a distance that is less than the mutual spacing between two treatment elements.

The installation according to the invention as described above is able to operate without rinsing water having to be supplied in connection with the removal of the outer layer from the products. For certain products it can sometimes nevertheless be necessary to carry out a supplementary treatment of this type. For this purpose there can be further series of treatment elements below the first two series of treatment elements, which further series are combined with a supply of liquid for rinsing the products.

A housing can be provided in the installation, which housing has two outside walls between which the series of treatment elements are enclosed, which outside walls collect the material originating from the products. At the bottom of said housing there are separate outputs for the treated products and for the material removed therefrom.

The outside walls can be closed all round and furthermore can contain one or more suction openings for generating a vacuum. This vacuum is generated between a brush group and the adjacent wall, such that the vacuum is produced at the side of said brush groups facing away from the channel. Such a vacuum promotes the transport of the peel from the treatment channel to the side walls of the housing. As a result improved discharge of the peel separately from the treated products is possible.

The treatment elements can be constructed in various ways. First of all, these can comprise rotationally symmetrical brushes. Furthermore, the treatment elements can comprise a flexible outer layer with an abrasive surface that is symmetrical in revolution. With this arrangement there can be a foam filling underneath the flexible outer layer, or the flexible outer layer can delimit a gas-tight or liquid-tight chamber that is filled with a medium that may or may not be pressurised.

BRIEF DESCRIPTION OF THE DRAWINGS

The treatment installation according to the invention will now be explained in more detail with reference to illustrative embodiments shown in the drawing.

DESCRIPTION OF THE PREFERRED EMBODIMENTS

Figure 1:
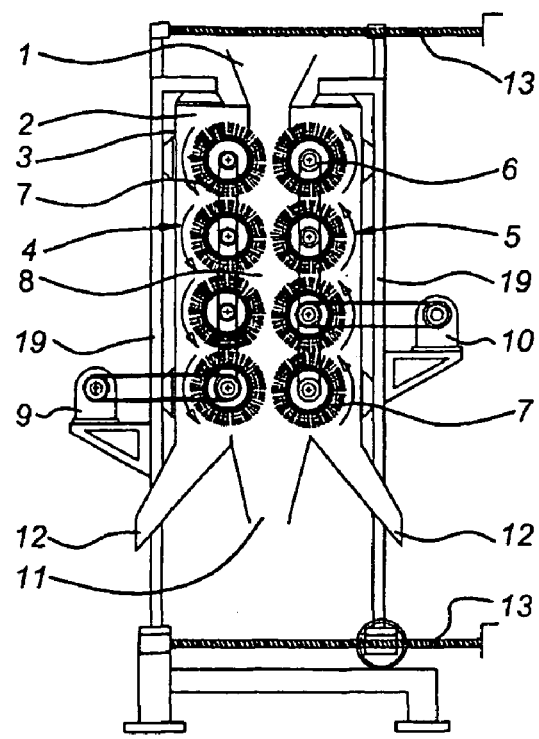
FIG. 1 shows a side view of a first embodiment of the installation.

The dry peeling installation 2 shown in FIG. 1 is provided with an input opening 1 which is made in a housing 3, with two groups of rollers 4 and 5 on either side of and transversely to the vertical axis of said housing, each of which rollers are able to rotate about a shaft 6. The rollers are each provided with a covering, for example brushes 7, around their periphery. The axes of each pair of brushes of groups 4 and 5, respectively, located opposite one another are in the same horizontal plane.

Figure 2:
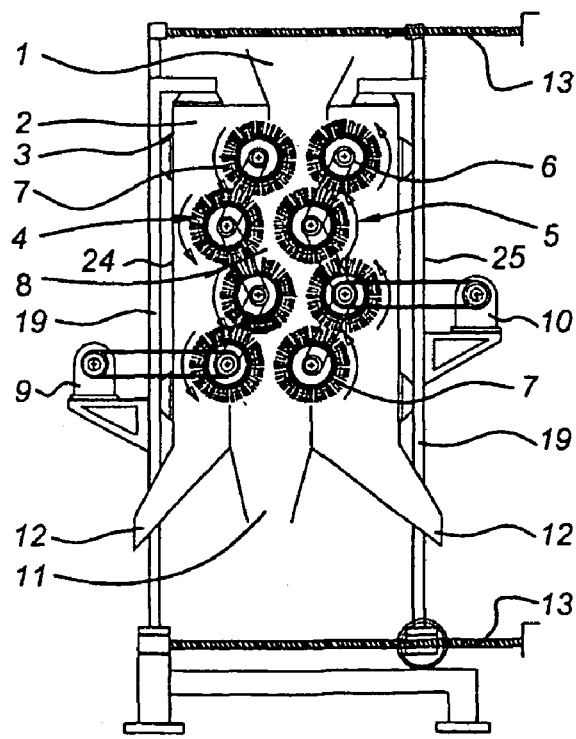
FIG. 2 shows a second embodiment.

The rollers of groups 4 and 5 are jointly all driven clockwise or all driven anticlockwise by, respectively, motor 9 and motor 10 seen in FIG. 2, such that, between the brush groups, the circumferential speeds of the two brush groups are opposed to one another.

On either side the housing 3 is provided at the bottom with two material output openings 12 and an output opening 11 for the products that have been brushed clean.

In the embodiment shown in FIG. 2 the axes of each pair of opposing brushes of, respectively, groups 4 and 5 are also in a horizontal plane, but the pairs are turn and turn about offset by half a brush diameter with respect to one another in the horizontal direction, such that the treatment channel 8 that is located between the rollers 4 and 5 becomes zigzag shaped.

Figure 3:
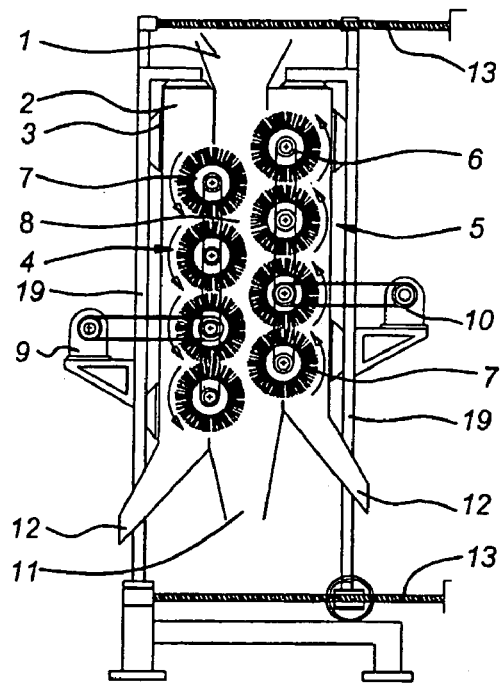
FIG. 3 shows a third embodiment.

In the preferred embodiment shown in FIG. 3 the groups of rollers 4 and 5 respectively are mutually arranged in one plane such that the axis of the group of rollers 4 is halfway along the axis of the group of rollers 5 in the vertical direction and a small gap remains between two brushes 7 of group 4, and, respectively, of group 5, located alongside one another. In this way the treatment channel 8 becomes zigzag shaped.

Figure 4:
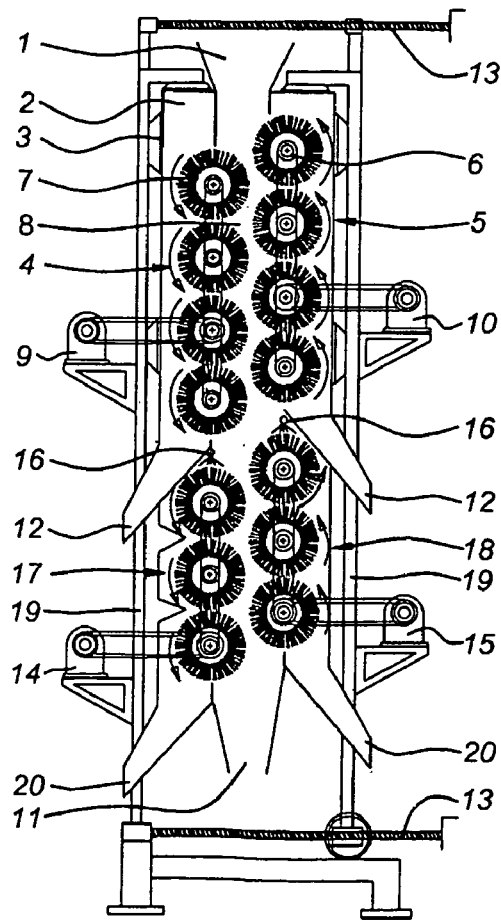
FIG. 4 shows a side view of a fourth embodiment with a combined dry brushing and post-rinsing machine.

In the installation shown in FIG. 4 a post-rinsing section has been added to the dry peeling installation by placing identical brush groups 17 and 18 below the existing brush groups 4 and 5, each of which brush groups 17 and 18, again, is driven by motor 14 and 15, respectively. Water is supplied by means of a water sprayer 16, so that the final residues of material are brushed off with water and discharged via outlet opening 20. The products that have been brushed clean and washed are discharged via opening 11. The whole is mounted in frame 19.

The bearings and drives for the rollers 4 and 5 are all outside the housing 3 of the dry peeling installation 2. This housing 3 is furthermore also provided with an outlet opening 11 at the bottom for the peeled tubers and with two outlet openings 12 for the peel brushed off. Tailored to the diameter of the tubers to be processed, the distance between the rollers 4 and 5 can be set by means of an adjusting device 13 in such a way that one of the two frame sections 19 can be moved in the horizontal direction.

Figure 5:
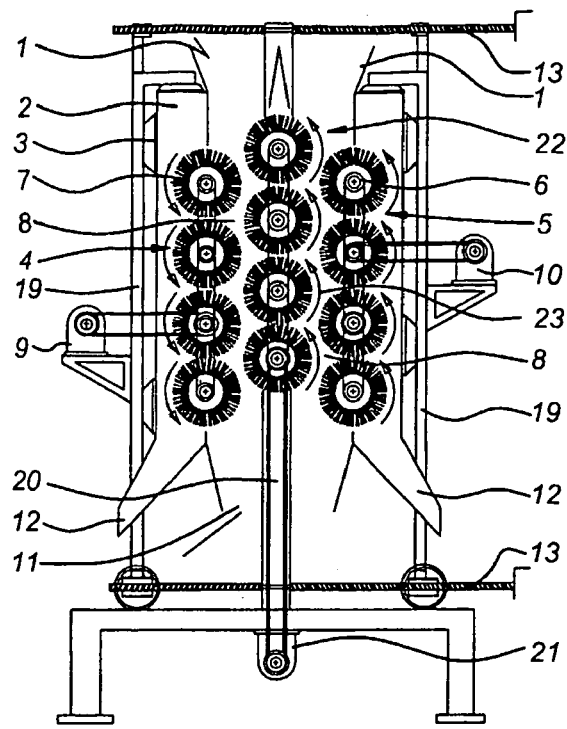
FIG. 5 shows a fifth embodiment.

In the installation shown in FIG. 5 the brush opening is as in FIG. 3, but expanded by an additional brush group, such that the opposing brushes of the two outermost groups 4 and 5 are in the same horizontal plane and the middle group 22 is offset with respect to the two outermost groups by half a brush diameter in the vertical direction.

The brush groups 4 and 5 are mounted in the frame sections 19 that are adjustable in the horizontal direction. The brush group 22 is mounted in the fixed frame section 20 and is driven by motor 21. The processing capacity can be doubled in a simple manner by means of the added additional brush group.

The mode of operation of the installations described above is as follows, taking the processing of crops as an example.

In a pre-treatment installation the skins of the tubers are softened in a known manner with the aid of steam or lye and are then fed via a feed device uniformly into the input opening 1 of the dry peeling installation 2. As a result of gravity the tubers drop into the treatment channel 8, in which they are brushed by the rollers 4 and 5 turn and turn about. The peel that has been brushed off is carried away through the small gaps present between the brushes and propelled by centrifugal force against the wall of the housing 3. As a result of gravity, the peel mass flows towards the peel outlet 12 to be discharged from there to a storage installation. The tubers that have been peeled and brushed clean drop into the outlet 11 under the influence of gravity and the difference between the circumferential speeds of the rollers 4 and 5 so as then to be fed to a storage or processing installation. The residence time of the tubers in the treatment channel is dependent on the resultant of gravity and the respective frictional forces of the rollers 4 and 5 on the tubers. The residence time can be adjusted by varying the speeds of revolution of the rollers 4 and 5.

Figure 6:
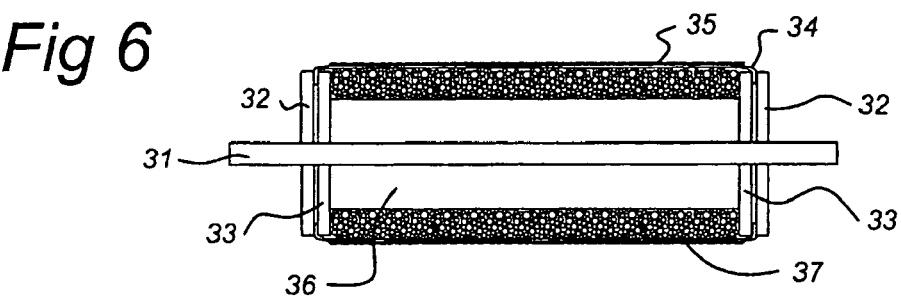
FIG. 6 shows the cross-section of an abrasive roller for use in the installation.

In FIG. 6 an abrasive roller is shown which consists of a shaft 1 with on either side an inner and an outer clamping plate 32 and 33, which clamping plates clamp a flexible jacket 34 between them. This flexible jacket is covered on the outside with an abrasive layer 35. A soft foam layer 37 is arranged between the core 36 and the flexible jacket 34.

Figure 7:
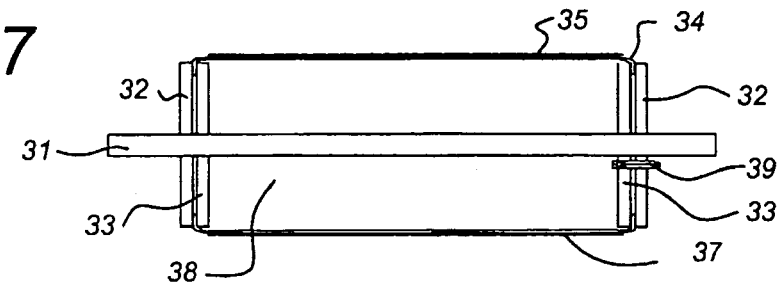
FIG. 7 shows a roller filled with gas or fluid.

In the case of the abrasive roller shown in FIG. 7 the flexible outer jacket 34 is filled with a gas or fluid 38, which is fed through valve 39.

Figure 8:
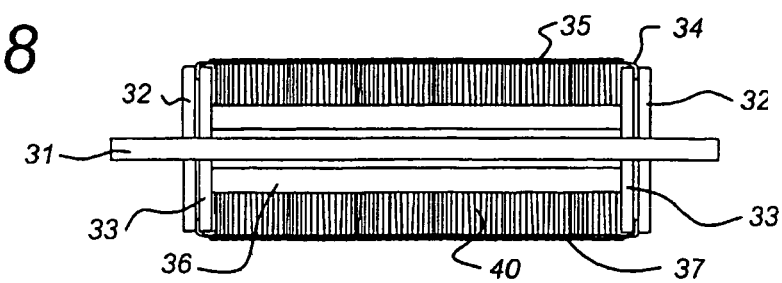
FIG. 8 shows a roller with a compressible brush below the outer layer.

In the case of the abrasive roller shown in FIG. 8 there is a compressible brush 40 below the flexible outer jacket 34.

Figure 9:
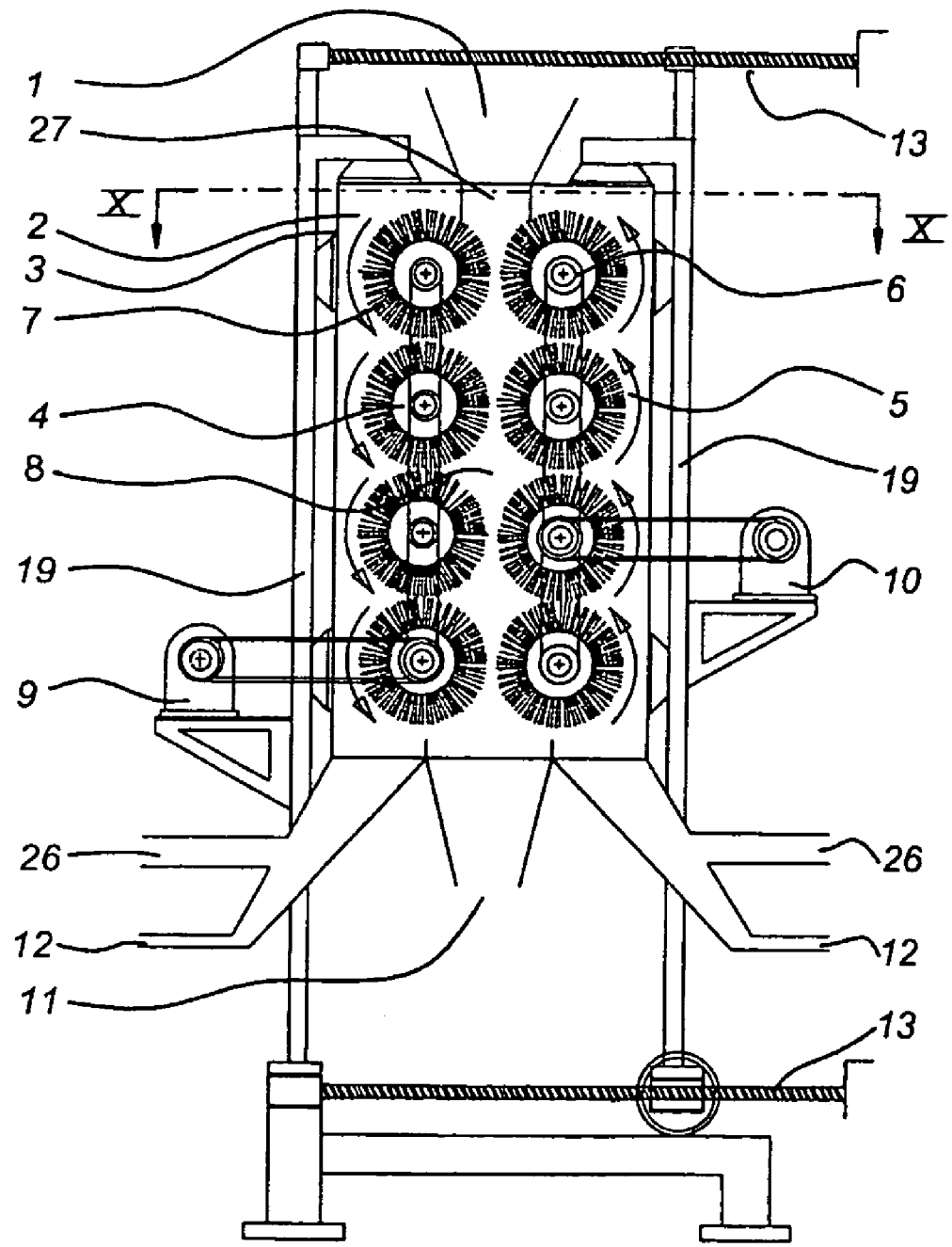
FIG. 9 shows an embodiment of the installation with a closed peripheral wall.
Figure 10:
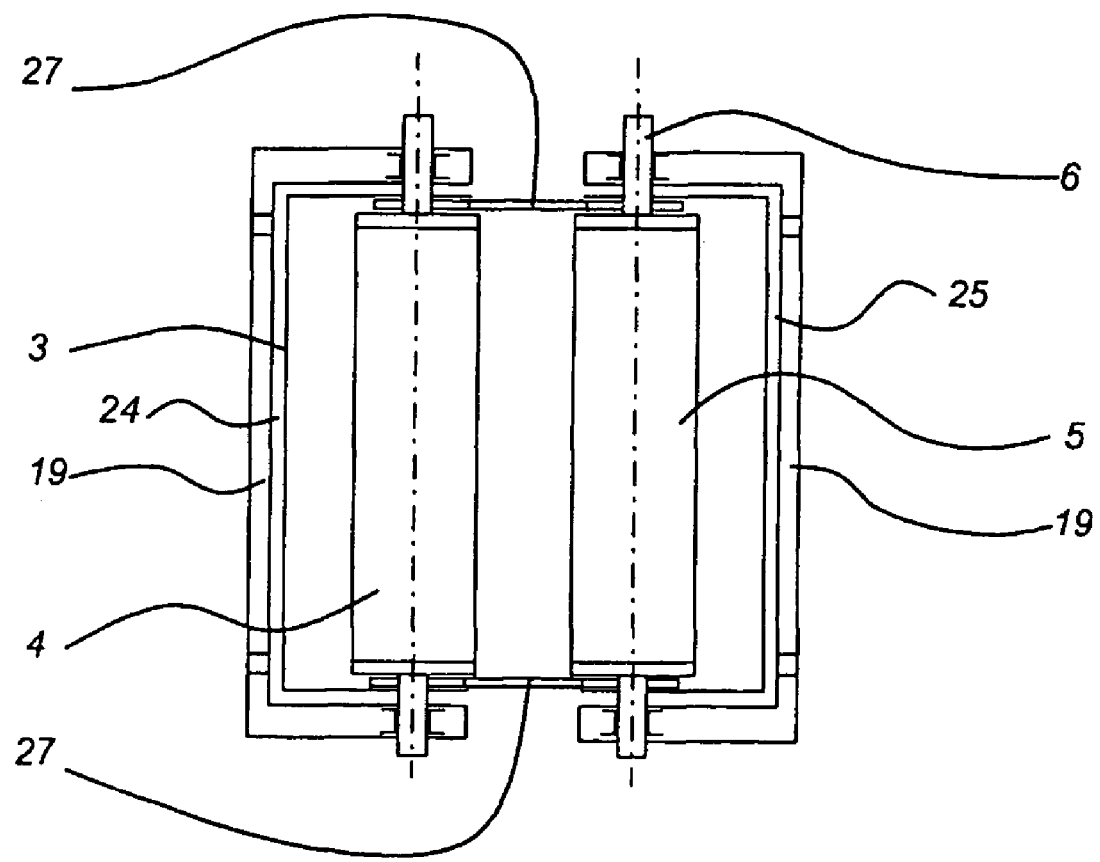
FIG. 10 shows a cross-section according to X—X in FIG. 9.

In the embodiment in FIGS. 9 and 10 a wall 24, 25, 27 that is closed all round is used. Furthermore, an air suction opening 26 is connected to the peel outlet 12. Via said air suction openings 26 a vacuum can be generated in the space between the brush group 4 and the wall 24, as well as between the brush group 5 and the wall 25. As a result of this vacuum the transport of the peel from the channel 8 to said respective spaces between the brush groups and the walls is promoted. The peel can then be discharged through the peel outlet 12, separated from the outlet 11 for the treated products.

The invention claimed is:

1. An installation for the treatment of products in bulb or tuber form configured to remove an outermost layer thereof, comprises a channel through which the products can be transported between an inlet and an outlet, situated near a top portion and a bottom portion, respectively, of the channel such that the inlet is situated above the outlet, wherein the channel is delimited by a first series of rotary abrasive treatment elements arranged alongside one another and extending transversely to a direction in which the products are transported, and by a second series of rotary abrasive treatment elements opposing the first series of rotary abrasive treatment elements arranged alongside one another and also extending transversely to a direction in which the products are transported, wherein the first and second series of abrasive treatment elements are partially enclosed between two outside walls, wherein the outside walls each include a secondary outlet situated at a bottom portion of each outside wall for receiving the outermost layer that is removed from the products and wherein each of the abrasive treatment elements of the first and second series of rotary abrasive treatment elements includes an abrasive surface.

2. The installation according to claim 1, wherein the first and second series of abrasive treatment elements are essentially parallel to one another.

3. The installation according to claim 1, wherein the first and second series of abrasive treatment elements are vertically oriented and are substantially parallel to one another.

4. The installation according to claim 1, wherein the first and second series of treatment elements are alternately offset in a zigzag form.

5. The installation according to claim 4, wherein the first and second series of abrasive treatment elements are of identical zigzag shape and an abrasive treatment element from the first series is positioned immediately alongside an abrasive treatment element from the second series.

6. The installation according to claim 1, wherein the first and second series of abrasive treatment elements are straight.

7. The installation according to claim 6, wherein the first and second series of abrasive treatment elements are offset parallel with respect to one another over a distance approximately equal to the mutual spacing between two abrasive treatment elements of the first and second series, respectively.

8. The installation according to claim 1, further comprising a third series of rotary abrasive treatment elements, wherein the first, second, and third series of abrasive treatment elements extend alongside one another and delimit two channels therebetween.

9. The installation according to claim 1, further comprising additional series of abrasive treatment elements situated below the first two series of abrasive treatment elements, wherein the additional series are combined with a liquid feed for rinsing the products.

10. The installation according to claim 1, wherein the first and second series of abrasive treatment elements turn in the same direction.

11. The installation according to claim 8, wherein the direction of one of the first, second, and third series of abrasive treatment elements turns in an opposite direction of one of the first, second, and third series of abrasive treatment elements.

12. The installation according to claim 1, wherein the outside walls fully enclose the first and second series of abrasive treatment elements.

13. The installation according to claim 12, wherein one of the outside walls and secondary outlets include at least one suction opening.

14. The installation according to claim 1, wherein the abrasive treatment elements comprise rotationally symmetrical brushes.

15. The installation according to claim 1, wherein each of the abrasive treatment elements include a flexible outer layer having an abrasive surface that is symmetrical in revolution.

16. The installation according to claim 15, wherein a foam filling is situated underneath the flexible outer layer.

17. The installation according to claim 15, wherein the flexible outer layer delimits one of a gas-tight and liquid-tight chamber that is filled with a pressurized medium.

18. The installation according to claim 16, wherein a mass is situated inside the flexible outer layer, wherein the mass presses against the inside of the flexible layer under the influence of the centrifugal force produced by rotation of the abrasive treatment elements.

19. The installation according to claim 1, wherein:
the first and second series of abrasive treatment elements are configured to be spaced apart at a plurality of distances from each other.

* * * * *